United States Patent [19]
Farrell

[11] Patent Number: 5,011,278
[45] Date of Patent: Apr. 30, 1991

[54] OPTICAL CORRELATOR METHOD AND APPARATUS FOR PARTICLE IMAGE VELOCIMETRY PROCESSING

[75] Inventor: Patrick V. Farrell, Madison, Wis.

[73] Assignee: Wisconsin Alumni Research Foundation, Madison, Wis.

[21] Appl. No.: 342,982

[22] Filed: Apr. 25, 1989

[51] Int. Cl.$^5$ .......................... G01P 3/36; G01B 9/02
[52] U.S. Cl. .................................. 356/28; 73/861.06; 356/351; 356/354
[58] Field of Search ................ 356/28, 28.5, 302, 345, 356/351, 354, 357; 73/861.05, 861.06

[56] References Cited

U.S. PATENT DOCUMENTS

| | | |
|---|---|---|
| 3,866,055 | 2/1975 | Pike . |
| 4,051,433 | 9/1977 | Dimotakis et al. . |
| 4,556,986 | 12/1985 | Craig .............................. 356/345 X |
| 4,624,561 | 11/1986 | Exton . |
| 4,729,109 | 3/1988 | Adrian et al. . |
| 4,807,990 | 2/1989 | Keefer . |

OTHER PUBLICATIONS

Roland Meynart, "Instantaneous Velocity Field Measurements in Unsteady Gas Flow by Speckle Velocimetry," *Applied Optics*, vol. 22, No. 4, Feb. 15, 1983, pp. 535–540.

Ronald J. Adrian et al., "Development of Pulsed Laser Velocimetry (PLV) for Measurement of Turbulence", Univ. of Missouri, Rolla, Chem. Engr. Dept., 1984, pp. 170–186.

K. Hinsch et al., "Fringe Visibility in Speckle Velocimetry and the Analysis of Random Flow Components," *Applied Optics*, vol. 23, No. 24, Dec. 15, 1984, pp. 4460–4462.

Hua-Kuang Liu et al., "Optical-Data Processing Properties of a Liquid-Crystal Television Spatial Light Modulator," *Optics Letters*, vol. 10, No. 12, Dec. 1985, pp. 635–637.

Matt Young, "Low-Cost LCD Video Display for Optical Processing," *Applied Optics*, vol. 25, No. 7, Apr. 1, 1986, pp. 1024–1026.

Francis T. S. Yu, "Microcomputer-Based Programmable Optical Correlator for Automatic Pattern Recognition and Identification," *Optics Letters*, vol. 11, No. 6, Jun. 1986, pp. 395–397.

Francis T. S. Yu et al., "Adaptive Real-Time Pattern Recognition Using a Liquid Crystal TV Based Joint Transform Correlator," *Applied Optics*, vol. 26, No. 8, Apr. 15, 1987, pp. 1370–1372.

C. C. Landreth et al., "Double Pulsed Particle Image Velocimeter with Directional Resolution for Complex Flows," *Experiments in Fluids*, vol. 6, 1988, pp. 119–128.

(List continued on next page.)

*Primary Examiner*—Linda J. Wallace
*Attorney, Agent, or Firm*—Foley & Lardner

[57] ABSTRACT

Young's fringes are produced from a double exposure image of particles in a flowing fluid by passing laser light through the film and projecting the light onto a screen. A video camera receives the image from the screen and controls a spatial light modulator. The spatial modulator has a two dimensional array of cells the transmissiveness of which are controlled in relation to the brightness of the corresponding pixel of the video camera image of the screen. A collimated beam of laser light is passed through the spatial light modulator to produce a diffraction pattern which is focused onto another video camera, with the output of the camera being digitized and provided to a microcomputer. The diffraction pattern formed when the laser light is passed through the spatial light modulator and is focused to a point corresponds to the two dimensional Fourier transform of the Young's fringe pattern projected onto the screen. The data obtained from the second video camera may be processed by the computer to find the correlation peak locations, areas, and other data of interest at the portion of the film through which the laser beam was projected. The film may be indexed such that the beam is passed through the film to cover the entire area of the double exposure image recorded on the film and thereby provide information concerning particle displacement and direction of the displacement at each position in the film.

24 Claims, 7 Drawing Sheets

OTHER PUBLICATIONS

Brian Bates et al., "Liquid Crystal Television in Speckle Metrology," *Applied Optics,* vol. 27, No. 14, Jul. 15, 1988, pp. 2816–2817.

Anthony M. Tai, "Low-Cost LCD Spatial Light Modulator with High Optical Quality," *Applied Optics,* vol. 25, No. 9, May 1, 1986, pp. 1380–1382.

David L. Reuss et al., "Two-Dimensional Velocity Measurements in a Laminar Flame Using Particle Image Velocimetry," submitted to Combustion Science and Technology, Feb. 9, 1989.

David L. Reuss et al., "Instantaneous Planar Measurements of Velocity and Large-Scale Vorticity and Strain Rate in an Engine Using Particle-Image Velocimetry," Society of Automotive Engineers, International Congress and Exposition, Detroit, Michigan, Feb. 27–Mar. 3, 1989.

J. M. Coupland and Neil A. Halliwell, "Particle image velocimetry: rapid transparency analysis using optical correlation," *Applied Optics,* vol. 27, No. 10, May 15, 1988, pp. 1919–1921.

OPTICAL CORRELATOR METHOD AND APPARATUS FOR PARTICLE IMAGE VELOCIMETRY PROCESSING

This invention was made with U.S. Government support awarded by the Department of the Army (DOD) and NASA grand number(s): DOD #DAAL03-86-K0174 and NASA #NAG3-718. The U.S. Government has certain rights in this invention.

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention pertains generally to the field of fluid velocity measurements and particularly to particle image velocimetry techniques.

BACKGROUND OF THE INVENTION

Significant recent interest in full-field velocity imaging techniques has focused on speckle velocimetry or particle image velocimetry techniques. See, e.g., Roland Meynart "Instantaneous Velocity Field Measurements in Unsteady Gas Flow by Speckle Velocimetry," Applied Optics, Vol. 22, No. 4, 15 Feb. 1983, pp. 535-540; Ronald J. Adrian, et al., "Development of Pulse Laser Velocimetry (PLV) for Measurement of Turbulent Flow," Symposium on Turbulence, Univ. of Missouri, Rolla, 1984, pp. 170-186; C. C. Landreth, et al., "Double Pulse Particle Image Velocimeter With Directional Resolution for Complex Flows," Experiments in Fluids, Vol. 6, 1988, pp. 119-128. Despite the different terminology of some authors, most of these techniques are similar. The techniques evaluate particle velocities from double exposure photographs separated by a known time differential. For conditions in which the particle density is large, a common analysis technique for the double exposure particle photographs is to pass an unexpanded laser beam through the double exposure image. The particles which fall within the beam scatter the beam, with particle image pairs producing the well known pattern of Young's fringes. Depending on the conditions under which the particle images were produced, the sets of particle pairs within the probe beam may exhibit a range of apparent displacements. Average displacement and direction information may be obtained by analyzing the Young's fringe pattern for the fringe spacing and fringe angle. Information concerning the details of the variance of the displacement of the velocity pairs within the probe beam from the mean displacement is carried by the modulated shape of the Young's fringes, but is difficult to extract directly. See, K. Hinsch, et al., "Fringe Visibility in Speckle Velocimetry and the Analysis of Random Flow Components," Applied Optics, Vol. 23, No. 24, Dec. 15, 1984, pp. 4460-4462.

An alternative processing technique has been proposed which acquires the two dimensional spatial Fourier transform of the Young's fringe pattern, providing correlation peaks in the frequency plane at the frequency and angle corresponding to the fringe pattern of Young's fringes. See, Ronald J. Adrian, et al., supra. The shape of the correlation peak, as well as the overall background level, can be calculated to provide quantitative estimates of the velocity variance at the particular laser beam probe point.

A typical arrangement for carrying out the forgoing technique includes a laser beam positioner, the image of interest, and some type of high resolution image capture device, such as a 512 x 512 charge coupled device (CCD) array. For each beam position corresponding to a position in the flow field, a fringe pattern is produced, recorded, and numerically transformed. However, numerical transformation of 512 x 512 arrays can be time consuming, even for relatively specialized processors. A typical field may require 10,000 (100 by 100) interrogation points, and an unsteady flow may require many images, depending on the levels of detail required. Consequently, a time consuming series of digital transforms are required.

SUMMARY OF THE INVENTION

The present invention carries out the two dimensional spatial Fourier transforming of the Young's fringes utilizing optical techniques. Relatively inexpensive components are utilized, and the required digital processing time can be substantially reduced from that required by present processing techniques.

In carrying out the present invention, a double exposure image is captured, as on a photograph, of particles in the flowing fluid in a conventional manner. The photograph is then projected, using laser light, on a position by position basis onto a screen and the image on the screen is viewed by an image capture device, such as a video camera. The two dimensional image of the fringes is converted to an electrical signal by the video camera and is used to drive a two dimensional transmissive spatial light modulator such as a liquid crystal array. Collimated light from a second laser beam is then passed through the optical modulator, and utilizing proper optical components, the light from the modulator is focused onto a viewing screen or another video camera. The far field pattern which is focused on the camera is analogous to the result of a digital two dimensional Fourier transformation of the original fringe pattern. When the far field correlation pattern is recorded by the video camera, the signal from the video camera may be digitized and supplied to a computer for processing to find the correlation peak locations, areas, and other data of interest. This is repeated for each point on the film until the entire film image has been covered. In this manner, a two dimensional Fourier transform of the fringe pattern is provided at rates which are at least equal to or faster than specialized digital processors and at a significantly lower cost.

Further objects, features, and advantages of the invention will be apparent from the following detailed description when taken in conjunction with the accompanying drawings.

DETAILED DESCRIPTION OF THE INVENTION

Figure 1:
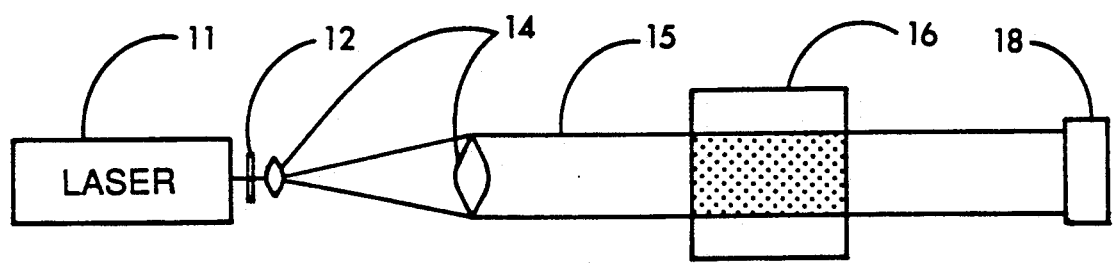
FIG. 1 is a schematic side view of apparatus for obtaining double exposure photographic images of particles flowing through a test cell.
Figure 2:
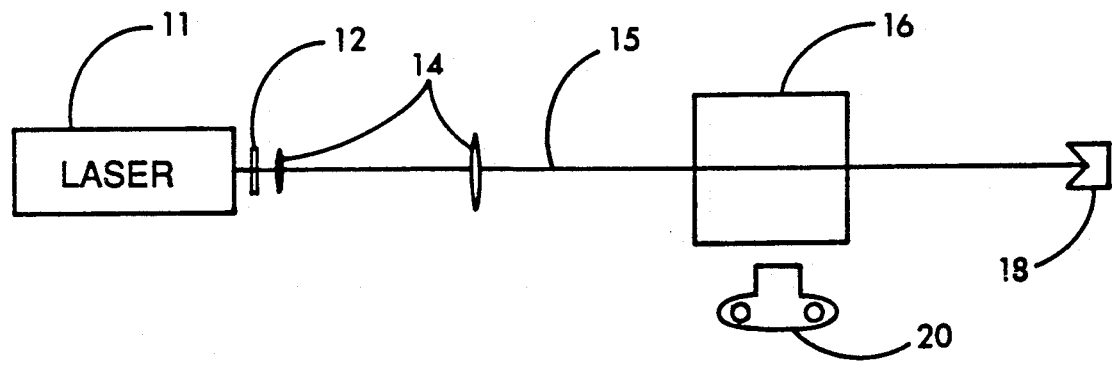
FIG. 2 is a top view of the apparatus of FIG. 1.

The present invention utilizes double exposure photographic media image frames produced in a conventional manner to capture the information on particle displacement in the flowing fluid. FIGS. 1 and 2 illustrate the apparatus utilized to obtain these film exposures, with FIG. 1 being a side view and FIG. 2 being a top view. Light from a laser 11 (e.g., a 4 Watt argon-ion laser from Coherent Inc.) is passed through a shutter 12 . (e.g., a computer controlled acousto-optic modulator from Interaction Inc.) to cylindrical lenses 14 which produce a wide but very thin beam 15 of the monochromatic light from the laser. The cylindrical lenses are selected for appropriate focal length and are available commercially (e.g., from Oriel Corp.) This beam is passed through a test cell 16 through which fluid is flowing. The test cell may be formed with a transparent wall or walls formed of a suitable material such as glass or acrylic plastic. The exiting beam is absorbed by a beam dump 18 in a conventional manner. The fluid flowing through the cell 16 has small particles therein which fluoresce or reflect the laser light. Exemplary particles are 1-2 micron titanium dioxide. A camera 20 (e.g., a conventional 35 mm camera) is positioned to capture the image of the fluid flowing through the test cell 16 and faces the broad side of the beam 15. To obtain an exposure, the shutter of the camera 20 is opened and the shutter 12 is quickly opened and closed twice in succession, with a precise and known time differential increment between the times at which the shutter is opened. The particles in the fluid moving through the cell 16 will be displaced a small distance in the fluid, evidencing the local motion of fluid during the time between openings of the shutter 12. Thus, each of the particles in the fluid will show up twice on the film exposed in the camera 20, separated by a small distance which is proportional to the velocity of the fluid at the particles, and with the direction of displacement of the particles indicating the direction of motion of the fluid with respect to the plane of the laser beam 15.

Figure 3:
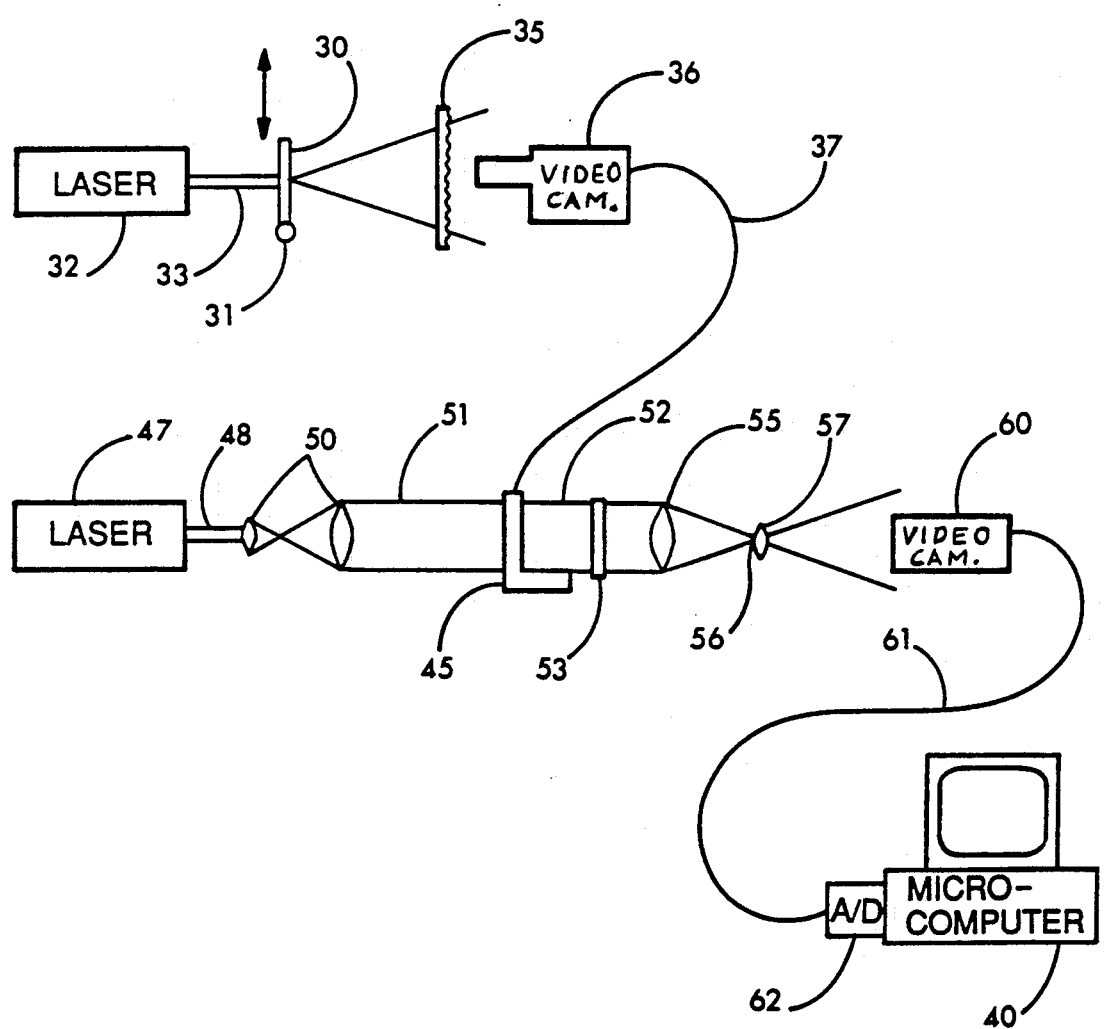
FIG. 3 is a schematic view of the apparatus of the present invention for carrying out the optical two dimensional Fourier transformation of the Young's fringe patterns and carrying out the analysis thereof.

The film from the camera 20 is then developed, contact printed onto film for a positive image, and placed in position in a holder 30 shown in FIG. 3. A stepper motor 31 (e.g., 0.00001 inch step displacement motors from Daedel, Inc.) drives the holder in two dimensional motion. Light from a laser 32 (e.g., 0.5 mW helium-neon laser from Uniphase, Inc.) is focused in a narrow beam 33 and passed through a portion of the film at each position of the film. The light passing through the film is projected on a ground glass screen 35 (e.g., Rolyn Optics ground glass). The image on the screen 35 is recorded by a video camera, 36 such as a vidicon camera (Xybion Corp.), which provides an electrical signal on its coaxial cable output lines 37 which correspond to the image on the glass screen 35 in the conventional raster scan. The stepper motors (2 axes), under control of a microcomputer system 40, are controlled to move the film on the holder 30 in step increments in a raster fashion so that the entire film has the beam 33 from the laser passed through it, with the resulting image at each position being recorded by the video camera 36. The microcomputer system 40 may consist of a microcomputer (e.g., a PC AT or clone such as Compuadd) and a frame grabber (e.g., Imaging Technologies FG-100), with a digital input/output board to drive the stepper motors.

At each position on the film at which the laser beam passes through the film, the light projected from the film onto the ground glass screen 35 will form a set of Young's fringes. The output signal on the line 37 from the video camera 36, which is the electrical signal corresponding to the two dimensional raster scanned image of these fringes, is utilized to control a two dimensional transmissive spatial light modulating device 45. This device may be an inexpensive modified liquid crystal television screen (e.g., Radio Shack 16-156 LCTV). The cells of the (e.g., 256 x 256) array of transmissive elements in the modulator 45 are controlled by the signal on the line 37 from the video camera 36 to attenuate the light passed through them in relation (e.g., inversely proportional) to the brightness signal for the corresponding pixel of the image recorded by the video camera 36. The image presented on the modulator 45 is thus essentially the Young's fringes which appear on the ground glass 35.

A laser 47 (e.g., Siemens 5 mW helium-neon laser) provides a beam of monochromatic light 48 which is expanded and collimated by lenses 50 (e.g., spatial filter and collimating lens from Newport Corp.) to form a collimated beam 51 which is passed through the optical modulator 45. The light beam 51 is diffracted by the image of the Young's fringes on the modulator 45, with the partially diffracted output beam 52 from the modulator being passed through a polarizer 53 (e.g., sheet polarizer, Oriel Corp.) and lens 55 (e.g., Nikkor Macro 105) to produce an image at the focal plane 56 which corresponds to the optical Fourier transform of the Young's fringes image on the modulator 45. Another lens 57 (e.g., microscope objective, such as 3 mm focal length achromat from Newport Corp.) positioned at the image plane 56 expands the light pattern at the plane 56 and images it onto a video camera 60 (e.g., RCA vidicon without lens) which produces a coaxial cable output signal on an output line 61 corresponding to a raster scan of the image striking the video camera. The resulting analog signal is converted to digital data in an analog to digital converter 62 (which may be within the frame grabber) and provided to the microcomputer system 40 for further processing.

The processing of each frame from the video camera 60 consists of DC subtraction to remove the center peak in the image recorded on the camera 60 (as explained below), peak finding (preferably using a line integral algorithm) to find the positions of these peaks, data storage to store the locations of the two peaks for each frame, film advance to send a signal to the stepper motor 31 to move the film to a new point for interrogation, and then a repeat of the steps above.

Figure 4:
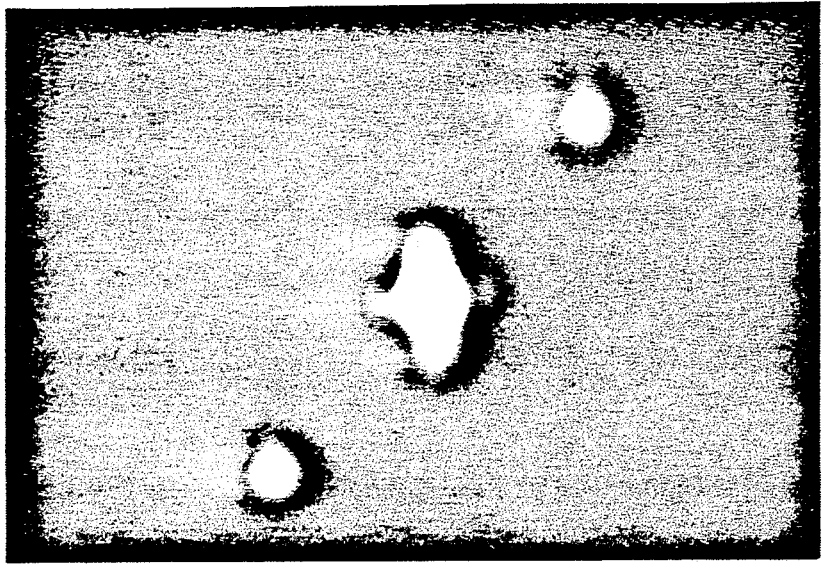
FIG. 4 shows the typical output of a processor for a phantom fringe pattern, showing a central "DC" spot and off axis correlation peaks corresponding to the input fringe angle and displacement.
Figure 8A:
FIGS. 8A and 8B are views as in FIGS. 5-7 but utilizing a lower frequency fringe spacing.
Figure 8B:
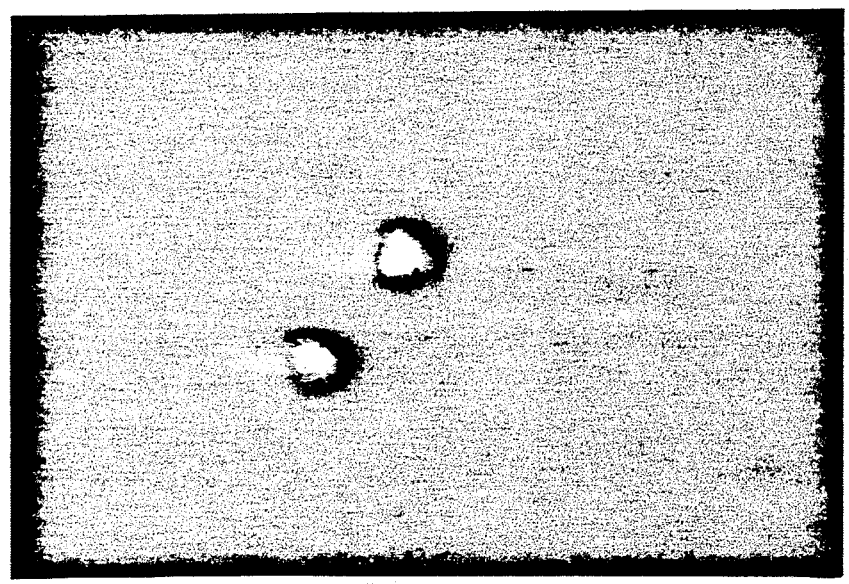

A typical output from the microcomputer as displayed on a video monitor for one laser probe beam position is shown in FIG. 4, illustrating a central DC spot and two off axis correlation peaks corresponding to the input fringe angle and displacement. A convenient low pass filtering technique is a frame subtraction, of a low frequency only convolution, from the high frequency frame modulated beam convolution. Results using this frame subtraction technique are illustrated in FIGS. 5-8 below. In each of the figures, the figure marked "A" is the input to the optical modulator 45—the image captured by the video camera 36—, and the figure marked "B" is the output of the microcomputer 40 after low frequency subtraction. FIGS. 5-8 show three different fringe orientations (all at the same spatial frequency), and their respective convolutions. FIG. 8 shows a lower frequency fringe spacing. Each of these images were produced as "phantom" fringes which were calculated numerically, rather than from a picture captured by the tv camera 36, and then used to modulate the image on the modulator 45 to allow precise control over the orientation. The phantom fringes allow characterization of the system for minimum resolvable fringe frequencies, as well as allowing the effects of contrast ratio and synthetic speckle noise to be determined.

Figure 5A:
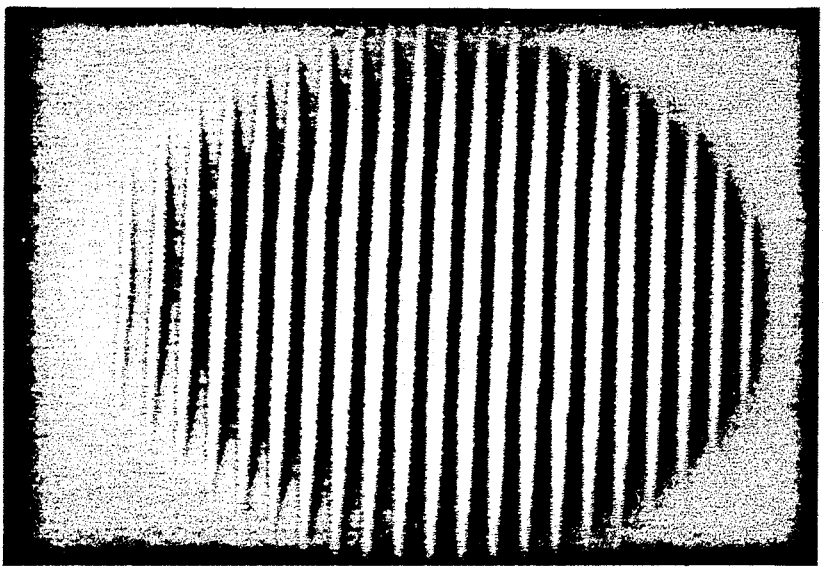
FIGS. 5-7 shows three different fringe orientations and the respective convolutions. In each figure, the figure marked "A" is the input Young's fringes as imaged on a video monitor and provided to the optical modulator and "B" is the processor output after low frequency subtraction.
Figure 5B:
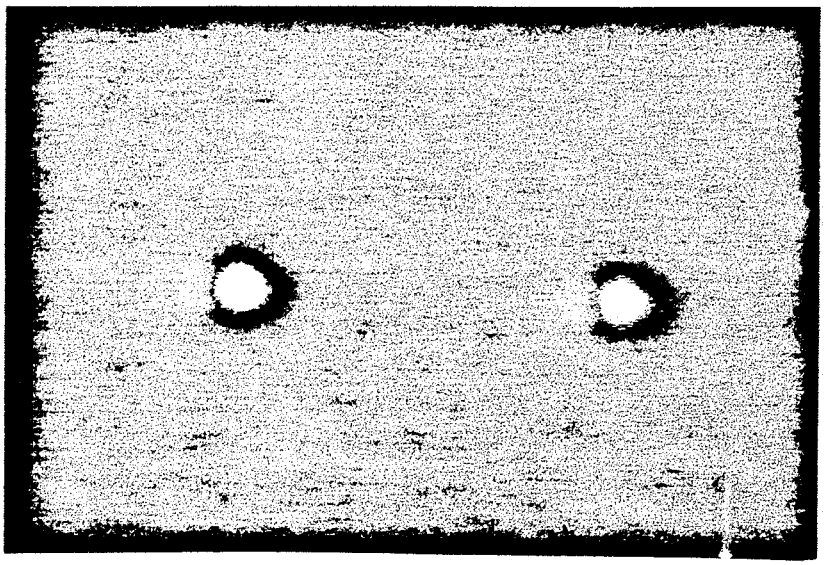
Figure 6A:
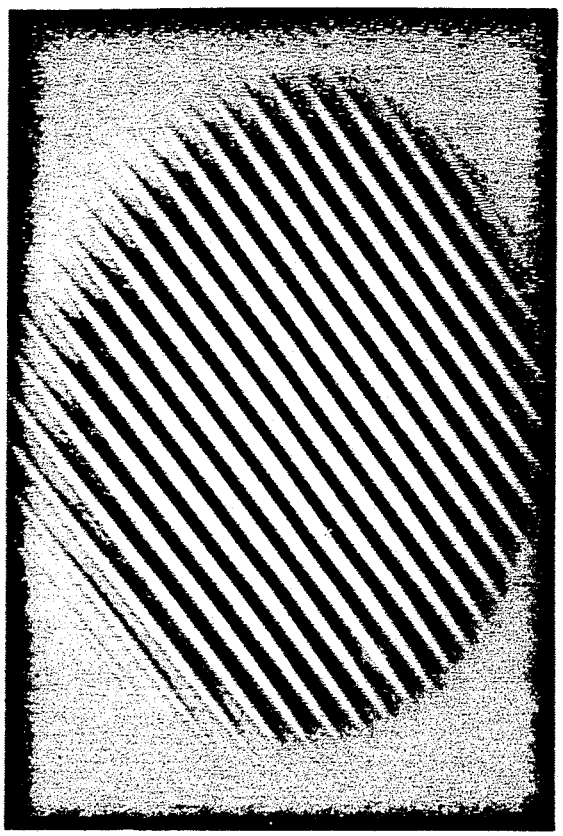
Figure 6B:
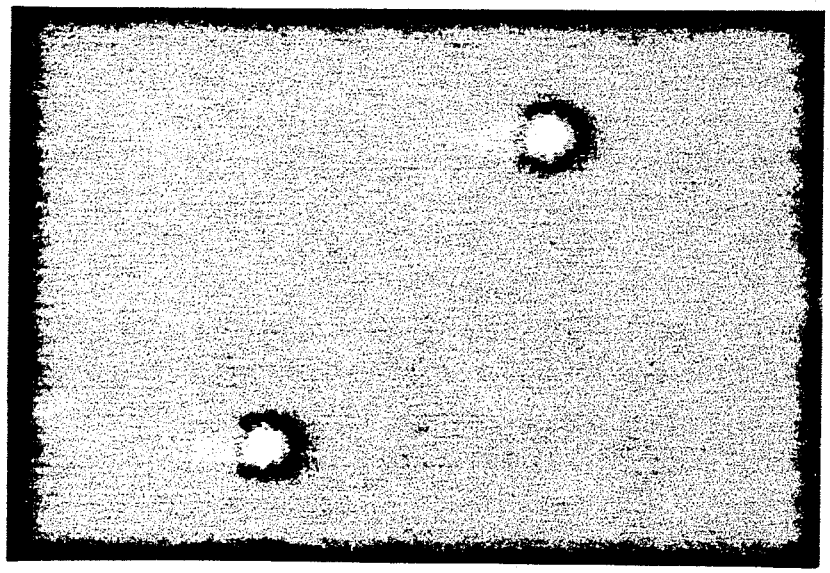
Figure 7A:
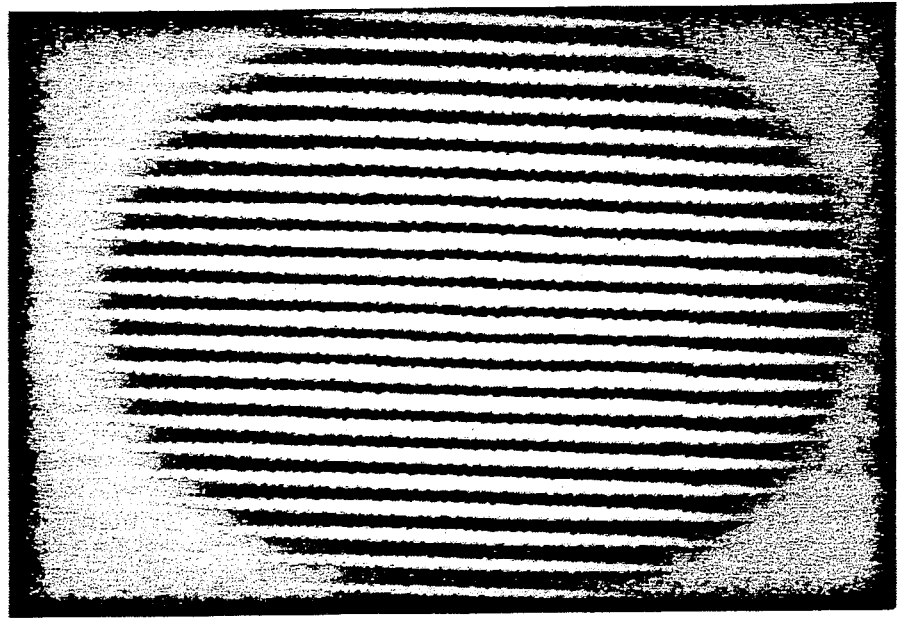
Figure 7B:
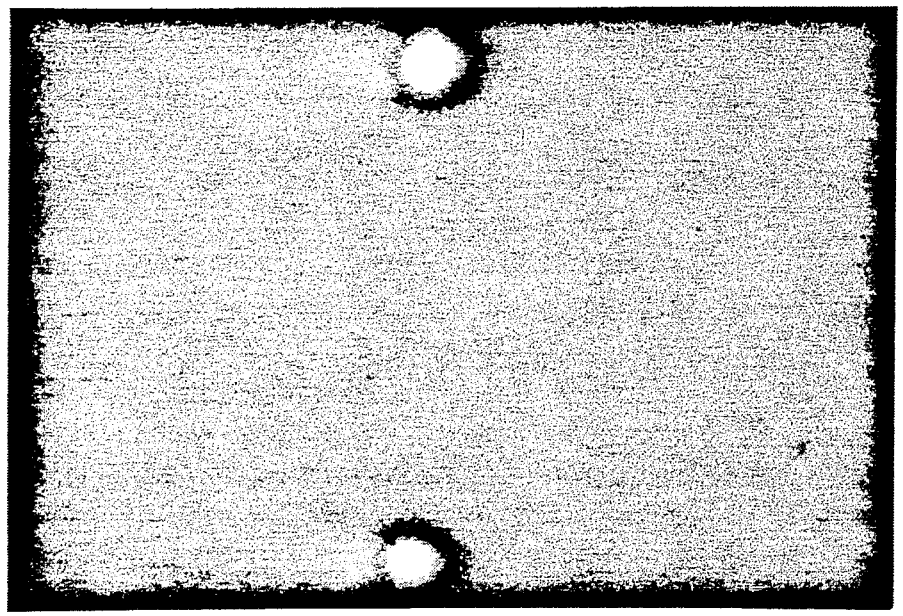
Figure 9:
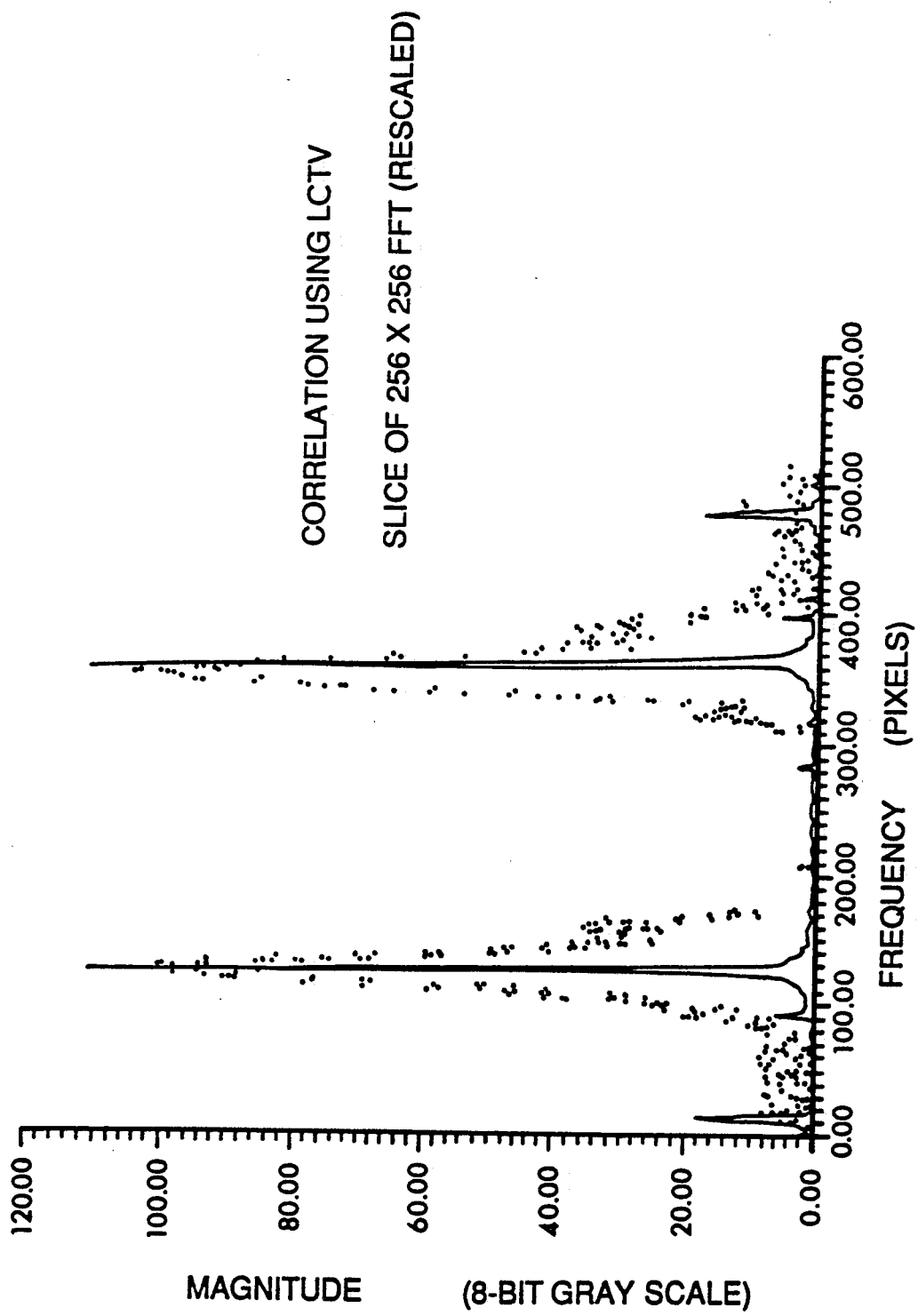
FIG. 9 is a graph illustrating a comparison of a slice through the correlation peak of the simulated fringe pattern of FIG. 5A digitally transformed using a 256 x 256 2-D FFT routine and a similar slice for the processor output of the present invention.

For further comparison purposes, the fringe pattern of FIG. 5A was simulated numerically and digitally transformed using a 256 x 256 two dimensional fast Fourier transform (FFT) routine. A comparison of a slice through the correlation peak of the digital transform with a similar slice for the processor output of the present invention (via the video camera 60 and an eight bit frame grabber of conventional design) is shown in FIG. 9. For this comparison, the digital transform was rescaled to match the video transform peak value and frequency. The two dimensional FFT took about 40 milliseconds on a Cray XMT with the FFT algorithm written in assembly language and optimized for the Cray's vector operation. The figure illustrates the relative conformance of the width of the video correlation peak with respect to the "idealized" digital correlation peak width.

The following is a source code listing, written in C and labeled t42b.c, for carrying out the image processing utilizing the subroutine library available with the frame grabber board (Imaging Technologies FG-100).

The basic elements of the program are:

Set-up phase, establishing values, limits, etc., from lines 1-49. This portion sets the step size and range of motion for the stepper motors, loads the reference image used for image subtraction, sets up the input look-up table to stretch the pixel values of the image if necessary, and finally implements the peak-finder to find the center of the reference image.

Loops, (lines 50-56 and 61-65) set up the repetition scheme, to allow the evaluation of the image point by point in a raster scan type of pattern. The loops increment the location of the point being interrogated by moving the stepper motors in the appropriate direction the appropriate amount.

Snap (line 57) captures the current image on camera 60 on to the computer frame grabber board. Since the picture is now in memory, changes to the image on the camera have no effect until another snap is issued.

Frame-subtract (line 58) calls a procedure (lines 69-89) which subtracts a reference image from the recently captured image. The image subtraction allows filtering the low frequency content out of the captured image.

Movex (line 59) calls a procedure (lines 312-330) which drives the x-axis stepper motor to move the film a certain amount in a given direction.

Peak-finder (line 60) calls a procedure (lines 91-310) which finds the location of the autocorrelation peaks in the image. The peak finder uses an integral sum search method in which line integrals of the pixel values are calculated at 20 pixel intervals in both x and y directions throughout the image. The maximum integral in the x direction and the maximum integral in the y direction are assumed to give coordinates close to the higher of the two expected autocorrelation peaks. A second search is initiated based on this approximate location, using line integrals in x and y directions at 1 pixel integrals. To save calculation time, the lines are truncated to 60 pixels long. The maximum x and y integrals from this search are considered the exact location of the autocorrelation peak. In order to find the second peak, the first peak is blocked out of the image, and the entire search procedure is reinitiated. The locations of the two peaks are stored on a ramdisk for speed.

After the peaks are found, (note the film has already been moved) a new image is snapped, and the process is repeated for each interrogation point in the field.

These are the basic steps in the program. Alternatively, the DC subtraction can be done optically with a high pass filter instead of by image subtraction.

It is understood that the invention is not limited to the particular embodiments described herein, but encompasses all such modified forms thereof as come within the scope of the following claims.

What is claimed is:

1. A method of image processing for use in measuring the velocity of particles flowing in a fluid, wherein images of the particles have been recorded on optical medium in an optical double exposure showing the displacement of the particles over a time increment, comprising the steps of:
   (a) projecting light through a portion of the medium onto a screen to form an image of Young's fringes:
   (b) modulating a second beam of light in a two dimensional array in accordance with the image formed on the screen to produce a diffraction pattern in the light so modulated;
   (c) forming an image of the diffraction pattern.

2. The method of claim 1 wherein steps (a), (b) and (c) are repeated in a sequence with the light in step (a) projected through a different portion of the medium for each repetition to cover the entire image recorded on the medium.

3. The method of claim 1 further including the step of providing an electrical signal corresponding to the image of the diffraction pattern.

4. The method of claim 2 further including the step of providing an electrical signal corresponding to the image of the diffraction pattern at each of the portions of the medium through which light is projected.

5. The method of claim 3 wherein the step of providing an electrical signal the signal corresponds to the light intensity of the diffraction pattern in a raster scan of the image.

6. The method of claim 5 further including the steps of converting the electrical signal to digital data and analyzing the data to find the frequency and orientation of the diffraction pattern at the portion of the medium through which the light was projected.

7. The method of claim 1 wherein the step of projecting light through a portion of the medium is carried out by activating a laser to direct a narrow beam of monochromatic laser light through the portion of the medium, and wherein the step of modulating a second beam of light, the second beam of light is provided by activating a laser to provide a collimated beam of monochromatic light which is modulated in the two dimensional array in accordance with the image formed on the screen.

8. The method of claim 1 wherein the step of forming an image of the diffraction pattern is carried out by focusing the modulated second beam of light onto a video camera.

9. The method of claim 1 wherein the step of modulating a second beam of light is carried out by passing a beam of monochromatic light through a two dimensional spatial light modulator having a two dimensional matrix of cells of variable transmissiveness, each of the cells being controlled to attenuate the light impinging thereon in relation to the light intensity of the corresponding part of the image on the screen which manifests the Young's fringes.

10. Apparatus for image processing for use in measuring the velocity of particles flowing in a fluid, wherein images of the particles have been recorded on an optical medium in an optical double exposure showing the displacement of particles over a time increment, comprising:
   (a) means for projecting light through a portion of the optical medium onto a screen to form an image manifesting Young'fringes;
   (b) means for modulating a second beam of light in a two dimensional array in accordance with the image formed on the screen to produce a diffraction pattern in the light so modulated;
   (c) means for viewing the diffraction pattern and forming an electrical signal corresponding thereto.

11. The apparatus of claim 10 further including means for analyzing the electrical signal corresponding to the diffraction pattern to determine the magnitude and orientation of the fringes at the portion of the recorded medium through which the light was projected.

12. The apparatus of claim 10 further including means for holding the optical medium and for moving the optical medium in a pattern in step wise motion so that light is projected through the medium over the entire area of the medium constituting the recorded information.

13. The apparatus of claim 10 wherein the means for modulating includes a video camera mounted to record the image formed on the screen and to provide an electrical signal corresponding thereto and a spatial light modulator connected to receive the signal from the video camera and having a two dimensional array of cells which are controlled to pass light therethrough in relation to the intensity of a portion of the image formed on the screen.

14. The apparatus of claim 13 wherein the spatial light modulator comprises a rectangular array of liquid crystal cells.

15. The apparatus of claim 10 wherein the means for projecting light through a portion of the medium includes a laser which projects a narrow beam of monochromatic light which is directed to pass through a small portion of the medium and with the light projected therefrom striking the screen, and wherein the screen comprises a translucent screen through which the image formed on the screen can be viewed.

16. The apparatus of claim 13 wherein the means for modulating a second beam of light further includes a laser providing an output beam of monochromatic light as the second beam of light and means for expanding and collimating the output beam from the laser and passing the collimated beam through the spatial light modulator.

17. The apparatus of claim 14 including a panel of polarizer material mounted to receive the light modulated by the spatial light modulator and to polarize the light, and further including lenses to receive light passed through the polarizer material and to focus the light to form an image of the diffraction pattern.

18. Apparatus for image processing for use in measuring the velocity of particles flowing in a fluid, wherein images of the particles have been recorded on an optical medium in an optical double exposure showing the displacement of particles over a time increment, comprising:
   (a) means for projecting light through a portion of the optical medium onto a screen to form an image manifesting Young'fringes;
   (b) means for modulating a second beam of light in a two dimensional array in accordance with the image formed on the screen to produce a diffraction pattern in the light so modulated;
   (c) means for viewing the diffraction pattern and forming an electrical signal corresponding thereto; and
   (d) means for analyzing the electrical signal corresponding to the diffraction pattern to determine the magnitude and orientation of the fringes at the portion of the recorded medium through which the light was projected.

19. THe apparatus of claim 18 further including means for holding the optical medium and for moving the optical medium in a pattern in step wise motion so that light is projected through the medium over the entire area of the medium constituting the recorded information.

20. The apparatus of claim 18 wherein the means for modulating includes a video camera mounted to record the image formed on the screen and to provide an electrical signal corresponding thereto and a spatial light modulator connected to receive the signal from the video camera and having a two dimensional array of cells which are controlled to pass light therethrough in relation to the intensity of a portion of the image formed on the screen.

21. The apparatus of claim 20 wherein the spatial light modulator comprises a rectangular array of liquid crystal cells.

22. The apparatus of claim 18 wherein the means for projecting light through a portion of the medium includes a laser which produces a narrow beam of monochromatic light which is directed to pass through a small portion of the medium and with the light projected therefrom striking the screen, and wherein the screen comprises a translucent screen through which the image formed on the screen can be viewed.

23. The apparatus of claim 20 wherein the means for modulating a second beam of light further includes a laser providing an output beam of monochromatic light as the second beam of light and means for expanding and collimating the output beam from the laser and passing the collimated beam through the spatial light modulator.

24. The apparatus of claim 21 including a panel of polarizer material mounted to receive the light modulated by the spatial light modulator and to polarize the light, and further including lenses to receive the light passed through the polarizer material and to focus the light to form an image of the diffraction pattern.

* * * * *

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

Column 1, line 32, "Pulse" should be --Pulsed--.

Column 5, line 50, after "FG-100)." add --FILE LISTING for t42b.c

```
1    #include <stlib.h>
2    #include <stdio.h>
3    #include <dos.h>
4    #include "itex100.h"
5    #include "stdtyp.h"
6
7    void peak_finder();
8    void frame_subtract();
9    void movex();
10   void movey();
11   long int nx,ny;
12   int dirx,diry;
13   FILE *fopen(),*fp;
14   main()
15       {
16       unsigned long delta_ms();
17       unsigned int ntotx,ntoty,ix,iy,llo,lhi;
18       int err;
19       float stepx,snx,stepy,sny;
20       char name[20],comment[200],cont[10];
21       sethdw(0x300,0xA0000,2,1);
22       setdim(1024,512,12);
23       initialize();
24       sclear(0);
25       setreg(0x10,0);
26       printf(" File name of reference image file: \n");
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above—identified patent and that said Letters Patent is hereby corrected as shown below:

```
27        scanf("%s",name);
28        err=readim(512,0,512,512,name,comment);
29        printf("Step size in x direction? \n";
30        scanf("%f",&stepx);
31        printf("Step size in y direction? \n");
32        scanf("%f",&stepy);
33        printf("Number of steps in the x direction? \n");
34        scanf("%d",&ntotx);
35        printf("Number of steps in the y direction? \n");
36        scanf("%d",&ntoty);
37        printf("Lut stretch lo and high values? \n");
38        scanf("%d %d",&llo,&lhi);
39        snx=stepx/5.08e-5;
40        nx=(long)snx;
41        sny=stepy/5.08e-5;
42        ny=(long)sny;
43        fp=fopen("f:pfiv.dat","w");
44        snap(1);
45        peak_finder();
46        lut_stretch(INPUT,0,llo,lhi);
47        dirx=0;
48        diry=0;
49        iy=0;
50        while ( iy < ntoty ) {
51          if ( dirx > 0 )
52             dirx=0;
53             else
54             dirx=1;
55             ix=0;
56          while ( ix < ntotx ) {
57             snap(1);
58             frame_subtract();
59             movex(dirx);
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

```
60              peak_finder();
61              ++ix;
62              }
63          movey(diry);
64          ++iy;
65          }
66      printf("\nDon't forget to copy data file from
            ramdisk (f:)! ");
67      }
68
69       void frame_subtract()
70      {
71      int i,j,ans,err,mag,angle,oflag;
72      static unsigned pxa[512],pxb[512],pxc[512];
73      i=0;
74      while ( i < 480 ) {
75          rhline(0,i,512,pxa);
76          rhline(512,i,512,pxb);
77          j=0;
78          while (j < 512) {
79              if( pxb[j] > pxa[j] )
80                  pxc[j]=0;
81                  else
82                  pxc[j]=pxa[j]-pxb[j];
83              ++j;
84              }
85          whline(0,i,512,pxc);
86          ++i;
87          }
88      }
89
90
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

```
91      void peak_finder()
92          {
93          unsigned int pxsum,pysum,ixmax,iymax;
94          int i,j,err,pval,ict,irx,iry,ii,ictx,icty;
95          int ictxmax,ictymax,iimin,iimax,ijmin,ijmax;
96          int iclear,jclear,peakx1,peaky1;
97          static unsigned pxa[512],px[512],py[512];
98          ict=0;
99          irx=15;
100         while (irx < 496) {
101             ict=ict+1;
102             rvline(irx,15,450,pxa);
103             ii=1;
104             pxsum=0;
105             while (ii < 450) {
106                 pxsum=pxsum+pxa[ii];
107                 ++ii;
108                 }
109             px[ict]=pxsum;
110             irx=irx+20;
111             }
112         ictx=ict;
113         ict=0;
114         iry=15;
115         while ( iry < 464 ) {
116             ict=ict+1;
117             rhline(15,iry,482,pxa);
118             ii=1;
119             pysum=0;
120             while ( ii < 482 ) {
121                 pysum=pysum+pxa[ii];
122                 ++ii;
```

UNITED STATES PATENT AND TRADEMARK OFFICE
CERTIFICATE OF CORRECTION

PATENT NO. : 5,011,278　　　　　　　　　　　　　　Page 5 of 13

DATED : April 30, 1991

INVENTOR(S) : Patrick V. Farrell

It is certified that error appears in the above-identified patent and that said Letters Patent is hereby corrected as shown below:

```
123                }
124           py[ict]=pysum;
125           iry=iry+20;
126         }
127     icty=ict;
128     ii=2;
129     ixmax=0;
130     while ( ii < ictx ) {
131         if ( px[ii] > ixmax ) {
132             ixmax=px[ii];
133             ictxmax=ii;
134         }
135         ++ii;
136     }
137     ii=2;
138     iymax=0;
139     while ( ii < icty ) {
140         if ( py[ii] > iymax ) {
141             iymax=py[ii];
142             ictymax=ii;
143         }
144         ++ii;
145     }
146             printf("first thru %d %d ",ictxmax,ictymax);
147     iimax=(ictxmax-1)*20+20;
148     iimin=(ictxmax-1)*20-20;
149     ijmax=(ictymax-1)*20+20;
150     ijmin=(ictymax-1)*20-20;
151     ict=0;
152     i=iimin;
153     while (i <= iimax) {
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

```
154             ict=ict+1;
155             rvline(i,ijmin,40,pxa);
156             ii=0;
157             pxsum=0;
158             while (ii < 40) {
159                     pxsum=pxsum+pxa[ii];
160                     ++ii;
161                     }
162             px[ict]=pxsum;
163             ++i;
164             }
165             ictx=ict;
166             i=ijmin;
167             ict=0;
168             while ( i <= ijmax ) {
169                     ict=ict+1;
170                     rhline(iimin,i,40,pxa);
171                     ii=0;
172                     pysum=0;
173                     while ( ii < 40 ) {
174                             pysum=pysum+pxa[ii];
175                             ++ii;
176                             }
177                     py[ict]=pysum;
178                     ++i;
179                     }
180             icty=ict;
181             ii=1;
182             ixmax=0;
183             while ( ii < ictx ) {
184                     if ( px[ii] > ixmax ) {
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

```
185                    ixmax=px[ii];
186                    ictxmax=(ii-1)+iimin;
187                }
188            ++ii;
189            }
190        iymax=0;
191        ii=1;
192        while ( ii < icty ) {
193                if ( py[ii] > iymax ) {
194                    iymax=py[ii];
195                    ictymax=(ii-1)+ijmin;
196                }
197            ++ii;
198            }
199        peakx1=ictxmax;
200        peaky1=ictymax;
201        iclear=ictxmax-40;
202        jclear=ictymax-40;
203        aclear(iclear,jclear,80,80,0);
204        ict=0;
205        irx=15;
206        while (irx < 496) {
207            ict=ict+1;
208            rvline(irx,15,450,pxa);
209            ii=1;
210            pxsum=0;
211            while (ii < 450) {
212                pxsum=pxsum+pxa[ii];
213                ++ii;
214            }
215            px[ict]=pxsum;
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

```
216                     irx=irx+20;
217                     }
218             ictx=ict;
219             ict=0;
220             iry=15;
221             while ( iry < 464 ) {
222                     ict=ict+1;
223                     rhline(15,iry,482,pxa);
224                     ii=1;
225                     pysum=0;
226                     while ( ii < 482 ) {
227                             pysum=pysum+pxa[ii];
228                             ++ii;
229                             }
230                     py[ict]=pysum;
231                     iry=iry+20;
232                     }
233             icty=ict;
234             ii=2;
235             ixmax=0;
236             while ( ii < ictx ) {
237                     if ( px[ii] > ixmax ) {
238                             ixmax=px[ii];
239                             ictxmax=ii;
240                             }
241                     ++ii;
242                     }
243             ii=2;
244             iymax=0;
245             while ( ii < icty ) {
246                     if ( py[ii] > iymax ) {
```

UNITED STATES PATENT AND TRADEMARK OFFICE
CERTIFICATE OF CORRECTION

PATENT NO. : 5,011,278
DATED : April 30, 1991
INVENTOR(S) : Patrick V. Farrell

It is certified that error appears in the above—identified patent and that said Letters Patent is hereby corrected as shown below:

```
247                         iymax=py[ii];
248                         ictymax=ii;
249                      }
250                  ++ii;
251              }
252          iimax=(ictxmax-1)*20+20;
253          iimin=(ictxmax-1)*20-20;
254          ijmax=(ictymax-1)*20+20;
255          ijmin=(ictymax-1)*20-20;
256          ict=0;
257          i=iimin;
258          while (i <= iimax) {
259                  ict=ict+1;
260                  rvline(i,ijmin,40,pxa);
261                  ii=0;
262                  pxsum=0;
263                  while (ii < 40) {
264                          pxsum=pxsum+pxa[ii];
265                          ++ii;
266                  }
267                  px[ict]=pxsum;
268                  ++i;
269          }
270          ictx=ict;
271          i=ijmin;
272          ict=0;
273          while ( i <= ijmax ) {
274                  ict=ict+1;
275                  rhline(iimin,i,40,pxa);
276                  ii=0;
277                  pysum=0;
```

UNITED STATES PATENT AND TRADEMARK OFFICE
CERTIFICATE OF CORRECTION

PATENT NO. : 5,011,278
DATED : April 30, 1991
INVENTOR(S) : Patrick V. Farrell

It is certified that error appears in the above—identified patent and that said Letters Patent is hereby corrected as shown below:

```
278                 while ( ii < 40 ) {
279                     pysum=pysum+pxa[ii];
280                     ++ii;
281                 }
282             py[ict]=pysum;
283             ++i;
284         }
285     icty=ict;
286     ii=1;
287     ixmax=0;
288     while ( ii < ictx ) {
289         if ( px[ii] > ixmax ) {
290             ixmax=px[ii];
291             ictxmax=ii-1+iimin;
292         }
293         ++ii;
294     }
295     iymax=0;
296     ii=1;
297     while ( ii < icty ) {
298         if ( py[ii] > iymax ) {
299             iymax=py[ii];
300             ictymax=ii-1+ijmin;
301         }
302         ++ii;
303     }
304     fprintf(fp," %d %d %d %d \n",peakx1,peaky1,ictxmax,
            ictymax);
305     printf("%d %d %d %d \n",peakx1,peaky1,ictxmax,ictymax);
306     hlclear(0,peaky1,512,255);
307     vlclear(peakx1,0,480,255);
308     hlclear(0,ictymax,512,255);
```

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above—identified patent and that said Letters Patent is hereby corrected as shown below:

```
309         vlclear(ictxmax,0,480,255);
310         }
311
312     void movex()
313         {
314         unsigned int address,xxx,yyy,xp,xn;
315         long int i;
316         address=816;
317         xxx=address+15;
318         yyy=address+12;
319         xp=4*dirx+1;
320         xn=4*dirx;
321         outp(xxx,128);
322         outp(yyy,xn);
323         i=0;
324         while ( i < nx ) {
325             outp(yyy,xp);
326             outp(yyy,xn);
327             ++i;
328             }
329         outp(yyy,48);
330         }
331     void movey()
332         {
333         unsigned int address,xxx,yyy,yp,yn;
334         long int i;
335         address=816;
336         xxx=address+15;
337         yyy=address+12;
338         yp=8*diry+2;
339         yn=8*diry;
```

UNITED STATES PATENT AND TRADEMARK OFFICE
CERTIFICATE OF CORRECTION

PATENT NO. : 5,011,278
DATED : April 30, 1991
INVENTOR(S) : Patrick V. Farrell

It is certified that error appears in the above-identified patent and that said Letters Patent is hereby corrected as shown below:

```
340        outp(xxx,128);
341        outp(yyy,yn);
342        i=0;
343        while( i < ny ) {
344             outp(yyy,yp);
345             outp(yyy,yn);
346             ++i;
347             }
348        outp(yyy,48);
349        }
350
351
352
```

Column 6, line 45, "fringes:" should be --fringes;--.
Column 7, line 35, "Young'fringes," should be
    --Young's fringes;--
Column 7, line 67, "projects" should be --produces--.
Column 8, line 26, "Young'fringes," should be
    --Young's fringes,--.
Column 8, line 39, "THe" should be --The--.

UNITED STATES PATENT AND TRADEMARK OFFICE
CERTIFICATE OF CORRECTION

PATENT NO. : 5,011,278

DATED : April 30, 1991

INVENTOR(S) : Patrick V. Farrell

It is certified that error appears in the above-identified patent and that said Letters Patent is hereby corrected as shown below:

Column 10, line 2, delete "the" after the word "receive".

Signed and Sealed this

Twenty-third Day of March, 1993

*Attest:*

STEPHEN G. KUNIN

*Attesting Officer*  *Acting Commissioner of Patents and Trademarks*